UNITED STATES PATENT OFFICE.

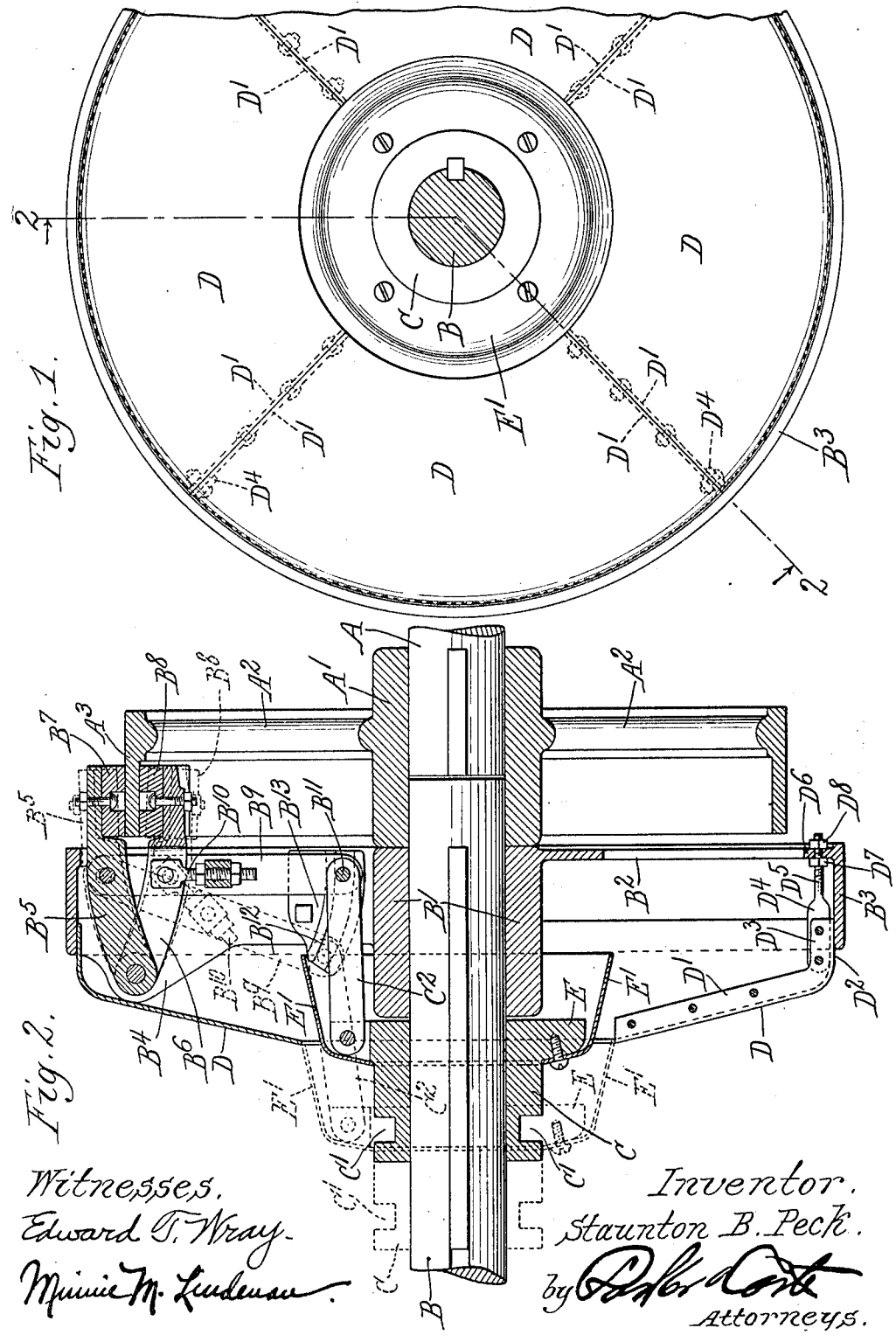

STAUNTON B. PECK, OF CHICAGO, ILLINOIS, ASSIGNOR TO LINK-BELT COMPANY, OF CHICAGO, ILLINOIS, A CORPORATION OF ILLINOIS.

CASING FOR FRICTION-CLUTCHES.

1,020,441.  Specification of Letters Patent.  Patented Mar. 19, 1912.

Application filed November 6, 1911. Serial No. 658,821.

*To all whom it may concern:*

Be it known that I, STAUNTON B. PECK, a citizen of the United States, residing at Chicago, in the county of Cook and State of Illinois, have invented a certain new and useful Improvement in Casings for Friction-Clutches, of which the following is a specification.

My invention relates to improvements in casings for friction clutches.

It is illustrated diagrammatically in one form in the accompanying drawing, wherein—

Figure 1 is an elevation; Fig. 2 a section along line 2—2 of Fig. 1.

Like characters refer to like parts throughout the several figures.

The driven shaft A has the hub $A^1$ keyed thereto. The arms $A^2$, projecting from the hub $A^1$, carry the overhanging brake or clutch rim $A^3$. The driving shaft B abuts the shaft A and has its end in rotatable engagement with the hub $A^1$. The hub $B^1$ is keyed to the shaft B and from it project the arms $B^2$ supporting the rim $B^3$. The web $B^4$ interposed between the hub $B^1$ and rim $B^3$ carries the pivotally mounted levers $B^5$ $B^6$ terminating in the friction members $B^7$ $B^8$ respectively in opposition to the inner and outer surfaces of the rim $A^3$. The link $B^9$ is pivotally mounted on the lever $B^5$ intermediate its pivotal point and the friction surface. The adjustable link $B^{10}$ is pivotally mounted on the link $B^9$ at one end, and on the lever $B^6$ at the other. The link $B^9$ is provided at its end farthest removed from the lever $B^5$ with the pin $B^{11}$ in slidable engagement with the cam slot $B^{12}$ in the lug $B^{13}$ on the hub $B^1$. The sleeve C having the annular groove $C^1$ to engage a shifting mechanism not shown, is slidably feathered on the shaft B and is provided with the link $C^2$ pivotally mounted thereon and pivotally mounted at the other end on the pin $B^{11}$. The segmental sections D, which I have preferably shown four in number, but which may be of any suitable number, have radially disposed and inwardly turned edges $D^1$ riveted or bolted together to form a conical shield. The inwardly turned portions $D^2$ carry the lugs $D^3$ to which are attached the links $D^4$ terminating in the screw-threaded projections $D^5$ in engagement with the lugs $D^6$ on the rim $B^3$ and held in position by the lock nuts $D^7$ $D^8$. The sleeve C is provided with the annular shoulder E slotted to permit the passage of the link $C^2$ and carrying the bell shaped guard $E^1$ which overhangs the links $C^2$, and is of such diameter at its inner end as to completely close the central opening left by the conical guard when the sleeve C is at the outer limit of its excursion.

It will be evident that while I have shown in my drawings an operative device, still many changes might be made in size, shape and arrangement of the parts without departing materially from the spirit of my invention.

The object of my invention is to provide means whereby the projecting rotating parts of a friction clutch may be inclosed by a rotating cover which can be mounted on and be shipped with the clutch. It serves to protect the clutch parts in transit, to protect them from dust and dirt when the clutch is in use by interrupting the currents of air therethrough, and it particularly serves as a protection for the workman who might otherwise be injured by such projecting parts when they are in motion if at work in the vicinity.

As shown in the drawings, the clutch to which I have applied my invention is composed of sundry parts which are preferably partially inclosed within a ring. The clutch is suitably mounted on the main shaft and rotates therewith.

In the particular form of clutch herein referred to, there are jaws on one side of the ring adapted to clutch the pulley on the shaft which is to be driven. On the other side of the ring are the projecting parts which are associated with a lever whereby the clutch and jaws may be operated while the clutch mechanism is in rotation. These parts consist of sundry projecting arms and more or less rough and irregular portions which when in rotation are of such a nature as to give no notice of their irregular nature to the workman who may therefore be very easily deceived and injured. Moreover, in such a clutch as is here illustrated, portions of the working parts are longitudinally movable along the shaft so that they project at varying distances from the case.

My casing comprises a smooth, outwardly projecting curved body which incloses the rough and irregular parts on the controlling side of the clutch and is secured to the ring so as to rotate therewith. Where as in this case there are longitudinally moving clutch portions my casing is divided into two parts, each presenting a smooth exterior curved surface, the outer in the nature of a projecting annulus secured to the ring and perforated at its center to give room for the shaft and the longitudinally moving parts of the clutch and the inner cup-shaped and secured to and moving with the longitudinally moving portion of the clutch. It is shaped so as to fill the central opening in the outer portion of the casing as nearly as may be possible and not to emerge therefrom when at the limit of its outer excursion. In the preferred form, the opening in the inner portion of the casing is shaped so as to inclose the clutch portions and when at the limit of its outer excursion to just fill the opening in the outer portion of the casing so that when it is at the limit of its inner excursion the whole casing presents a substantially uniform exterior with a slight annular opening in the center, and when at the limit of its outer excursion, the whole casing presents the appearance of a complete two-part covering, the whole having a smooth surface with a central protruding hub-like portion and no appreciable aperture or space between them.

Claims:

1. The combination of a friction clutch with a two-part casing comprising a dish-shaped smooth surfaced outer cover attached to and rotating with the clutch and perforated about the shaft and an inner cover for the clutch portions about the shaft and adapted to move longitudinally therealong and within the aperture of the outer cover body and secured to the clutch so as to rotate and move longitudinally therewith.

2. The combination of a friction clutch having an exterior ring with a two-part casing comprising a smooth surfaced outer cover provided with a central aperture and means for attaching the same to the ring so that it will rotate therewith and an inner cover for the clutch portions surrounding the shaft and clutch controlling parts and secured thereto so as to rotate therewith and adapted to move longitudinally along the shaft and within the aperture in the outer cover.

3. The combination of a friction clutch having a rotating clutch portion and a longitudinally moving and rotating clutch portion with a two-part smooth surfaced cover therefor the outer part secured to the rotating portion of the clutch and inwardly perforated and the inner cover for the clutch portions secured to the rotating and longitudinally movable portion of the clutch and movable within the aperture.

STAUNTON B. PECK.

Witnesses:
OLIVE ERICKSON,
JULIUS S. HOLL.

Copies of this patent may be obtained for five cents each, by addressing the "Commissioner of Patents, Washington, D. C."